(12) United States Patent
Zhang et al.

(10) Patent No.: US 12,140,842 B2
(45) Date of Patent: Nov. 12, 2024

(54) DISPLAY SUBSTRATE AND PREPARATION METHOD THEREFOR, DISPLAY DEVICE, AND MASK

(71) Applicants: Beijing BOE Display Technology Co., Ltd., Beijing (CN); BOE Technology Group Co., Ltd., Beijing (CN)

(72) Inventors: Jiliang Zhang, Beijing (CN); Xiaona Liu, Beijing (CN); Yu Ma, Beijing (CN); Weitao Chen, Beijing (CN); Xiao Wang, Beijing (CN); Yuqiong Chen, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/779,571

(22) PCT Filed: Jun. 18, 2021

(86) PCT No.: PCT/CN2021/100959
§ 371 (c)(1),
(2) Date: May 25, 2022

(87) PCT Pub. No.: WO2022/261951
PCT Pub. Date: Dec. 22, 2022

(65) Prior Publication Data
US 2024/0168347 A1     May 23, 2024

(51) Int. Cl.
G02F 1/1362 (2006.01)
(52) U.S. Cl.
CPC .. G02F 1/136286 (2013.01); G02F 1/136209 (2013.01); G02F 1/136227 (2013.01)

(58) Field of Classification Search
CPC ..................................... G02F 1/1362
See application file for complete search history.

(56) References Cited

U.S. PATENT DOCUMENTS

| | | | | |
|---|---|---|---|---|
| 2007/0279567 A1* | 12/2007 | Matsushima | ..... | G02F 1/134363 349/143 |
| 2009/0244464 A1* | 10/2009 | Kobayashi | ........ | G02F 1/133707 349/132 |

(Continued)

FOREIGN PATENT DOCUMENTS

| | | |
|---|---|---|
| CN | 103529993 A | 1/2014 |
| CN | 104267550 A | 1/2015 |

(Continued)

*Primary Examiner* — Sang V Nguyen
(74) *Attorney, Agent, or Firm* — Ling Wu; Stephen Yang; Ling and Yang Intellectual Property (57) ABSTRACT

A display substrate, a display device and a mask are provided. The display substrate includes a base substrate and a pixel electrode at a side of the base substrate; the pixel electrode includes at least two strip electrodes, a slit is provided between adjacent strip electrodes of the at least two strip electrodes, the slit at least includes a first corner end located on at least one end of the slit, the first corner end includes a first edge and a second edge oppositely disposed, and a first transition edge connecting an end of the first edge with an end of the second edge, the first transition edge has an arc shape protruding away from the first corner end; a first included angle is formed between the first and second edges, and the first included angle is greater than or equal to 0° and less than or equal to 13°.

19 Claims, 7 Drawing Sheets

(56) References Cited

U.S. PATENT DOCUMENTS

| | | | | |
|---|---|---|---|---|
| 2010/0079712 | A1* | 4/2010 | Tanaka | G02F 1/134363 |
| | | | | 349/123 |
| 2014/0063429 | A1* | 3/2014 | Huh | G02F 1/134309 |
| | | | | 349/139 |
| 2017/0003559 | A1* | 1/2017 | Wu | G02F 1/134309 |
| 2017/0038613 | A1* | 2/2017 | Han | G02F 1/137 |
| 2017/0184915 | A1 | 6/2017 | Yang et al. | |
| 2018/0210292 | A1* | 7/2018 | Liu | G02F 1/13439 |
| 2019/0011786 | A1* | 1/2019 | Liu | G02F 1/13439 |
| 2020/0110479 | A1 | 4/2020 | Liu et al. | |
| 2020/0400981 | A1* | 12/2020 | Adachi | G02F 1/133351 |
| 2021/0011570 | A1 | 1/2021 | Luo et al. | |
| 2021/0247867 | A1* | 8/2021 | Wang | G02F 1/1362 |
| 2022/0342266 | A1 | 10/2022 | Hu et al. | |

FOREIGN PATENT DOCUMENTS

| | | | | |
|---|---|---|---|---|
| CN | 104698696 | A | 6/2015 | |
| CN | 104932162 | A | 9/2015 | |
| CN | 105676550 | A | 6/2016 | |
| CN | 105700254 | A | 6/2016 | |
| CN | 106918966 | A | 7/2017 | |
| CN | 208297894 | U | 12/2018 | |
| CN | 109388265 | A | 2/2019 | |
| CN | 109445246 | * | 3/2019 | ........... G02F 1/1343 |
| CN | 109445246 | A | 3/2019 | |
| CN | 109557728 | * | 4/2019 | ........... G02F 1/1333 |
| CN | 109557728 | A | 4/2019 | |
| CN | 111308800 | A | 6/2020 | |
| CN | 111610677 | A | 9/2020 | |

* cited by examiner

DISPLAY SUBSTRATE AND PREPARATION METHOD THEREFOR, DISPLAY DEVICE, AND MASK

CROSS-REFERENCE TO RELATED APPLICATION

The present application is a U.S. National Phase Entry of International Application PCT/CN2021/100959 having an international filing date of Jun. 18, 2021, and the contents disclosed in the above-mentioned application are hereby incorporated as a part of this application.

TECHNICAL FIELD

The present disclosure relates to, but is not limited to, the field of display technology, and particularly to a display substrate, a method for preparing the display substrate, a display device and a mask.

BACKGROUND

Liquid Crystal Display Panel, as a mainstream display screen at present, has advantages such as low power consumption, small size, and low radiation.

At present, liquid crystal display panels commonly used in a horizontal electric field mode include liquid crystal display panels of In-Plane Switching (IPS) mode and liquid crystal display panels of Advanced Super Dimension Switch (ADS) mode.

The ADS display mode is widely used in the display field due to its wide viewing angle, high resolution and low power consumption. At present, in order to achieve an effect of high transmittance, in large-size and super-large-size display devices, pixel electrodes are covered within the range of data signal lines.

SUMMARY

The following is a summary of subject matters described herein in detail. The summary is not intended to limit a scope of protection of claims.

In a first aspect, an embodiment of the present disclosure provides a display substrate including a base substrate and a pixel electrode disposed at a side of the base substrate; the pixel electrode includes at least two strip electrodes, a slit is provided between adjacent strip electrodes of the at least two strip electrodes, the slit at least includes a first corner end located on at least one end of the slit, the first corner end includes a first edge and a second edge which are oppositely disposed, and a first transition edge connecting an end of the first edge with an end of the second edge, the first transition edge is has arc shape protruding along a direction away from the first corner end; a first included angle is formed between the first edge and the second edge, and the first included angle is greater than or equal to 0° and less than or equal to 13°.

In an exemplary implementation, the first included angle ranges from 9° to 11°.

In an exemplary implementation, the first included angle is 9.5°, 10° or 10.5°.

In an exemplary implementation, the display substrate further includes a gate line disposed at a side of the base substrate close to the pixel electrode and extending along the first direction, a first insulating layer disposed at a side of the gate line away from the base substrate, a data line disposed at a side of the first insulating layer away from the base substrate and extending along a second direction, a second insulating layer disposed at a side of the data line away from the base substrate, a common electrode disposed at a side of the second insulating layer away from the base substrate, a third insulating layer disposed at a side of the common electrode away from the base substrate, wherein the pixel electrode is disposed at a side of the third insulating layer away from the base substrate, and the first direction is different from the second direction.

In an exemplary implementation, the display substrate further includes a gate line disposed at a side of the base substrate close to the pixel electrode and extending along the first direction, the first edge forms a second included angle with the first direction, wherein the second included angle is 40° to 50°, and/or, the second edge forms a third included angle with the first direction, and the third included angle is 40° to 50°.

In an exemplary implementation, the second included angle is same as the third included angle.

In an exemplary implementation, an orthographic projection length H of the first corner end in a direction perpendicular to the first direction is greater than or equal to 3 um and less than or equal to 9 um.

In an exemplary implementation, the slit further includes a first body portion extending along a third direction, a second body portion extending along a fourth direction, and a connection portion connecting the first body portion with the second body portion, wherein the connection portion is V-shaped and the third direction is different from the fourth direction.

In an exemplary implementation, the slit includes a first slit, a second slit and a third slit between the first slit and the second slit. An orthographic projection length of a first corner end of the third slit in a direction perpendicular to the first direction is greater than an orthographic projection length of a first corner end of the second slit in the direction perpendicular to the first direction, an orthographic projection length of the first corner end of the second slit in the direction perpendicular to the first direction is greater than an orthographic projection length of a first corner end of the first slit in the direction perpendicular to the first direction.

In an exemplary implementation, a width of the third slit is greater than a width of the second slit; and/or, a width of the third slit is greater than the width of the first slit; and/or, the width of the first slit is equal to the width of the second slit.

In an exemplary implementation, the display substrate further includes a touch signal line, and an orthographic projection of the touch signal line on the base substrate at least partially located in an orthographic projection of the third slit on the base substrate.

In an exemplary implementation, an orthographic projection of the slit on the base substrate is not overlapped with an orthographic projection of the data line on the base substrate.

In an exemplary implementation, the display substrate further includes a touch signal line, and the touch signal line is disposed in a same layer as the data line.

In an exemplary implementation, a distance from an edge of a first side of the touch signal line to an edge of a first side of the pixel electrode is same as a distance from an edge of a second side of the touch signal line to an edge of a second side of the pixel electrode.

In an exemplary implementation, the display substrate further includes a light shielding layer, and the light shielding layer at least includes at least one first portion extending along the second direction.

In an exemplary implementation, the light shielding layer further includes a second portion extending along the first direction, the second portion is connected with the at least one first portion.

In an exemplary implementation, the display substrate further includes a touch signal line, the second portion is connected with the common electrode through a first via, and the at least one first portion is connected with the touch signal line through a second via.

In an exemplary implementation, the light shielding layer includes two oppositely disposed first portions and one second portion, one end of the second portion is connected with one end of one of the two oppositely disposed first portions, and the other end of the second portion is disconnected or connected with the other of the two oppositely disposed first portions.

In an exemplary implementation, a distance from an edge of a first side of the common electrode to an edge of a first side of the light shielding layer is same as a distance from an edge of a second side of the common electrode to an edge of a second side of the light shielding layer; and/or, a distance from the edge of the first side of the common electrode to an edge of a first side of the data line is same as a distance from the edge of the second side of the common electrode to an edge of a second side of the data line; and/or, a distance from the edge of the first side of the common electrode to an edge of a first side of the pixel electrode is same as a distance from the edge of the second side of the common electrode to an edge of a second side of the pixel electrode.

In an exemplary implementation, a distance from an edge of a first side of the pixel electrode to an edge of a first side of the light shielding layer is same as a distance from an edge of a second side of the pixel electrode to an edge of a second side of the light shielding layer; or, the distance from the edge of the first side of the pixel electrode to the edge of the first side of the light shielding layer is different from the distance from the edge of the second side of the pixel electrode to the edge of the second side of the light shielding layer.

In a second aspect, an embodiment of the present disclosure further provides a display device including the display substrate described above.

In a third aspect, an embodiment of the present disclosure provides a method for preparing the display substrate, including:

forming a pixel electrode at a side of a base substrate, wherein the pixel electrode includes at least two strip electrodes, a slit is provided between adjacent strip electrodes of the at least two strip electrodes, the slit at least includes a first corner end located on at least one end of the slit, the first corner end includes a first edge and a second edge which are oppositely disposed, and a first transition edge connecting an end of the first edge with an end of the second edge, the first transition edge has an arc shape protruding along a direction away from the first corner end; a first included angle is formed between the first edge and the second edge, and the first included angle ranges from 0° to 13°.

In a fourth aspect, an embodiment of the present disclosure further provides a mask including a pattern region, the pattern region includes at least one mask pattern, the at least one mask pattern at least includes a second corner end located on at least one end of a mask pattern, the second corner end includes a third edge, a fourth edge which are oppositely disposed, and a second transition edge connecting an end of the third edge with an end of the fourth edge, the second transition edge has an arc shape protruding along a direction away from the second corner end; the third edge and/or the fourth edge are in a shape of straight, and a fifth included angle is formed between the third edge and the fourth edge, and the fifth included angle ranges from 0° to 5°.

Other aspects will become apparent upon reading and understanding of the drawings and detailed description.

BRIEF DESCRIPTION OF DRAWINGS

FIG. 3a is a first sectional view taken along direction A-A' in FIG. 2a.

FIG. 9 is a partial sectional view of c in FIG. 2a.

FIG. 10 is a second sectional view taken along direction A-A' in FIG. 2a.

DETAILED DESCRIPTION

Embodiments of the present disclosure will be described in detail below in combination with the drawings. It is to be noted that implementation modes may be implemented in multiple different forms. Those of ordinary skills in the art can easily understand such a fact that implementation modes and contents may be transformed into various forms without departing from the purpose and scope of the present disclosure. Therefore, the present disclosure should not be construed as being only limited to the contents described in the following implementation modes. The embodiments in the present disclosure and features in the embodiments may be combined randomly with each other if there is no conflict.

In this specification, for sake of convenience, wordings indicating directional or positional relationships, such as "center", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred device or element must have a particular orientation and be constructed and operated in the particular orientation. Therefore, they cannot be understood as limitations on the present disclosure. The position relationships between the constituent elements are changed appropriately according to the directions according to which the various constituent elements are described. Therefore, appropriate replacements may be made according to situations without being limited to the wordings described in the specification.

In this specification, unless otherwise specified and defined explicitly, terms "mount", "mutually connect", and "connect" should be understood in a broad sense. For example, a connection may be a fixed connection, a detachable connection, or an integrated connection. It may be a mechanical connection or an electrical connection. It may be a direct mutual connection, or an indirect connection through middleware, or internal communication between two elements. Those of ordinary skills in the art may understand meanings of the above-mentioned terms in the present disclosure according to situations.

In the present disclosure, "about" refers to that a boundary is defined not so strictly and numerical values in process and measurement error ranges are allowed.

Figure 1:
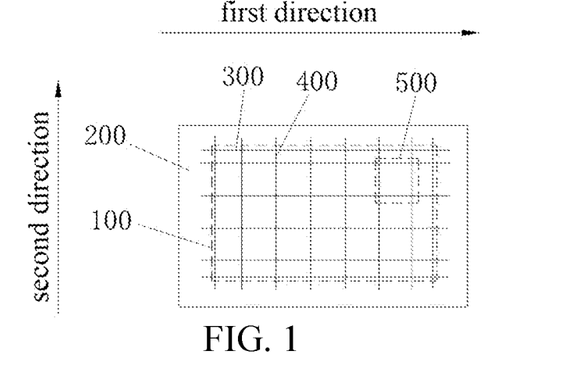
FIG. 1 is a schematic diagram of a structure of a display substrate according to an embodiment of the present disclosure.

FIG. 1 is a schematic diagram of a structure of a display substrate according to an embodiment of the present disclosure. As shown in FIG. 1, the display substrate provided in the embodiment of the present disclosure may include a display region 100 for displaying imagines and a peripheral region 200 located at a periphery of the display region 100. The display region 100 of the display substrate according to the embodiment of the present disclosure may include multiple gate lines 300 and multiple data lines 400, and a pixel 500 connected with the multiple gate lines 300 and the multiple data lines 400. The gate lines 300 are used for transmitting a gate electrical signal and the data lines 400 are used for transmitting a data electrical signal. The multiple gate lines 300 extend along a first direction (e.g. a horizontal direction) and the multiple gate lines 300 may be parallel to each other. The multiple data lines 400 extend along a second direction (e.g. a vertical direction) and the multiple data lines 400 may be parallel to each other. Herein, the first direction is different from the second direction. For example, the first direction is perpendicular to the second direction.

As shown in FIG. 1, the pixel 500 may include a thin film transistor (TFT), a pixel electrode and a common electrode, the pixel electrode is connected with a drain of the thin film transistor (TFT), at least one of the multiple data lines 400 is connected with a source of the thin film transistor (TFT), at least one of the multiple gate lines 300 is connected with a gate of the thin film transistor (TFT). The thin film transistor may be turned on or off by a gate electrical signal applied by a gate line 300 connected to the thin film transistor and may transmit a data electrical signal provided by a data line 400 connected to the thin film transistor to the pixel electrode. The pixel 500 may display an image according to the data electrical signal applied to the pixel electrode.

As shown in FIG. 1 the peripheral region 200 may be a portion of a non-display region where the display substrate does not display an image. The peripheral region 200 may be disposed around the periphery of the display region 100. Alternatively, the peripheral region 200 may be disposed extending along a side portion of the display substrate.

As shown in FIG. 1, the gate lines 300 and the data lines 400 in the display region 100 may partially extend to the peripheral region 200. The peripheral region 200 may include a common voltage line (not shown in the figure). The common voltage line is connected with a common electrode in the display region 100 for transmitting a common voltage $V_{com}$ to the common electrode in the display region 100.

Figure 2A:
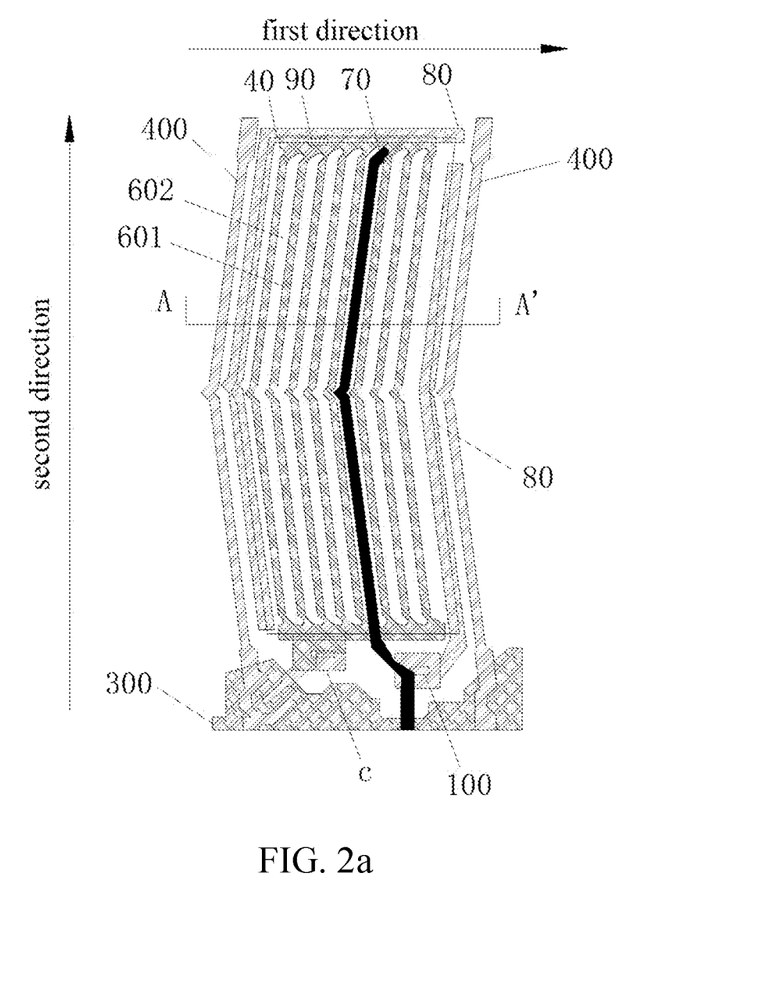
FIG. 2a is a first schematic diagram of a structure of pixels in a display substrate according to an embodiment of the present disclosure.
Figure 3A:
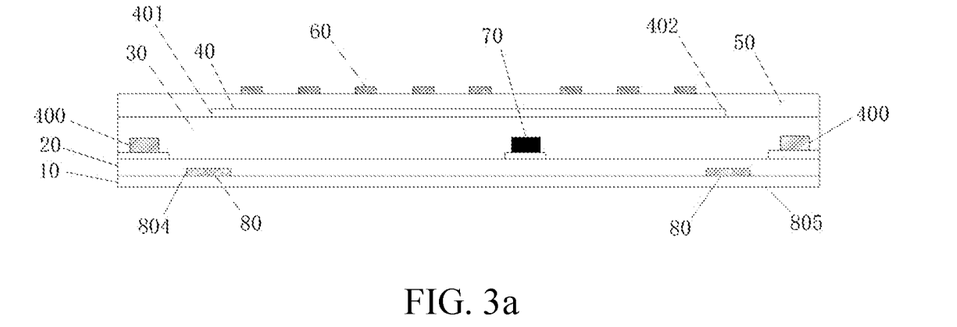

FIG. 2a is a first schematic diagram of a structure of pixels in a display substrate according to an embodiment of the present disclosure. FIG. 3a is a first sectional view taken along a direction A-A' in FIG. 2a. As shown in FIG. 2a to FIG. 3b, the display substrate according to the embodiment of the present disclosure may be a TFT array substrate. The display substrate according to the embodiment of the present disclosure may include a base substrate 10, a gate line 300 at a side of the base substrate 10 and extending along a first direction, a first insulating layer 20 disposed at a side of the gate line 300 away from the base substrate 10 and covering the gate line 300, a data line 400 disposed at a side of the first insulating layer 20 away from the base substrate 10 and extending along a second direction, a second insulating layer 30 disposed at a side of the data line 400 away from the base substrate 10 and covering the data line 400, a common electrode 40 disposed at a side of the second insulating layer 30 away from the base substrate 10, a third insulating layer 50 disposed at a side of the common electrode 40 away from the base substrate 10 and covering the common electrode 40, a pixel electrode 60 disposed at a side of the third insulating layer 50 away from the base substrate 10. Herein, the first direction is different from the second direction. For example, the first direction is perpendicular to the second direction.

In an exemplary implementation, the base substrate 10 may be a rigid substrate. For example, the base substrate 10 may include a glass substrate, a quartz substrate, a resin substrate, and the like.

In an exemplary implementation, the gate line 300 may be disposed in a same layer as a gate (to be described later) of the thin film transistor and prepared using a same material by a same process. In some embodiments, the gate line 300 may be integrally formed with the gate. The gate line 300 may extend along the first direction (e.g. a horizontal direction) of the base substrate 10 and may be connected with the gate of the thin film transistor. A material of the gate line 300 may include an aluminum-based metal such as aluminum or aluminum alloy, a silver-based metal such as silver or silver alloy, a copper-based metal such as copper or copper alloy, and a molybdenum-based metal such as molybdenum or molybdenum alloy.

In an exemplary implementation, the first insulating layer 20 may be a gate insulating layer covering the gate line 300 and the gate of the thin film transistor. A material of the first insulating layer 20 may include silicon oxide or silicon nitride or the like.

In an exemplary implementation, the data line 400 may be disposed in a same layer as the source (to be described later) of the thin film transistor and prepared using a same material by a same process. The data line 400 may extend along the second direction (e.g. a vertical direction) of the base substrate 10 and may be connected with the source of the thin film transistor. The data line 400 may be disposed to intersect with the gate line 300 to define multiple pixel regions, wherein each of the pixel regions corresponds to one pixel.

In an exemplary implementation, the data line 400 may not extend entirely along the second direction. For example, the data line 400 may have a bent portion and an extending direction of the data line 400 may deviate from the second direction but the data line 400 as a whole may be viewed as extending along the second direction.

In an exemplary implementation, the second insulating layer 30 covers the data line 400 and the source and the drain in the thin film transistor. A material of the second insulating layer 30 may include silicon oxide or silicon nitride or the like.

In an exemplary implementation, multiple common electrodes 40 correspond to multiple common electrodes 40 of the multiple pixel regions. An orthographic projection of the common electrode 40 on the base substrate 10 may not be overlapped with an orthographic projection of the data line 400 on the base substrate 10. A material of the common electrodes 40 may be a transparent conductive material. For example, the material of the common electrodes 40 may be Indium Tin Oxide (ITO), Indium Zinc Oxide (IZO), indium tin zinc oxide (ITZO), or aluminum doped zinc oxide (AZO).

In an exemplary implementation, the third insulating layer 50 covers the common electrode 40. A material of the third insulating layer 50 may include silicon oxide or silicon nitride or the like.

In an exemplary implementation, the pixel electrode 60 may be connected with a drain (to be described later) of the thin film transistor. An orthographic projection of the pixel electrode 60 on the base substrate 10 may not be overlapped with an orthographic projection of the data line 400 on the base substrate 10. A material of the pixel electrode 60 may be a transparent conductive material. For example, the material of the pixel electrode 60 may be ITO, IZO, indium tin zinc oxide (ITZO), or aluminum doped zinc oxide (AZO).

Figure 2B:
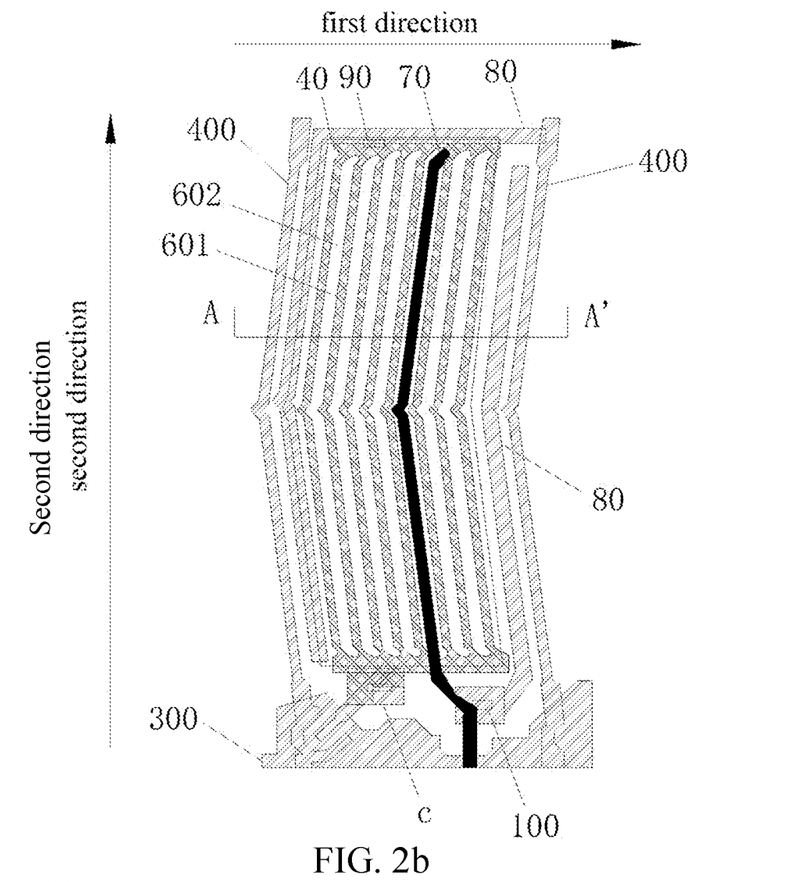
FIG. 2b is a second schematic diagram of a structure of pixels in a display substrate according to an embodiment of the present disclosure.

In an exemplary implementation, as shown in FIGS. 2a and 2b, the pixel electrode 60 in the display substrate according to the embodiment of the present disclosure includes at least two strip electrodes 601, and a slit 602 is disposed between adjacent strip electrodes 601 of the at least two strip electrodes 601, wherein the slit 602 at least includes a first corner end 603 located on at least one end of the slit 602. The first corner end 603 in the display substrate according to the embodiment of the present disclosure can reduce a problem of trace mura with the liquid crystal display substrate. It should be noted that the corner end of the present disclosure is described with an example that a bending direction of the corner end is the same as a bending direction of a middle portion of the slit, and the corner end is bent rightwards as shown in FIG. 2. Actual products can use a corner end with a bending direction different from the bending direction of the middle portion of the slit, alternatively, bending directions of corner ends located at two ends of a same slit are different.

Inventors of the present disclosure have found that the first corner end 603 of the pixel electrode in the display substrate causes the liquid crystal in the end region of the pixel electrode 60 to be arranged disorderedly by finger pressing, leading to problems such as tailing of scratch, slow recovery time, and the like.

Figure 4:
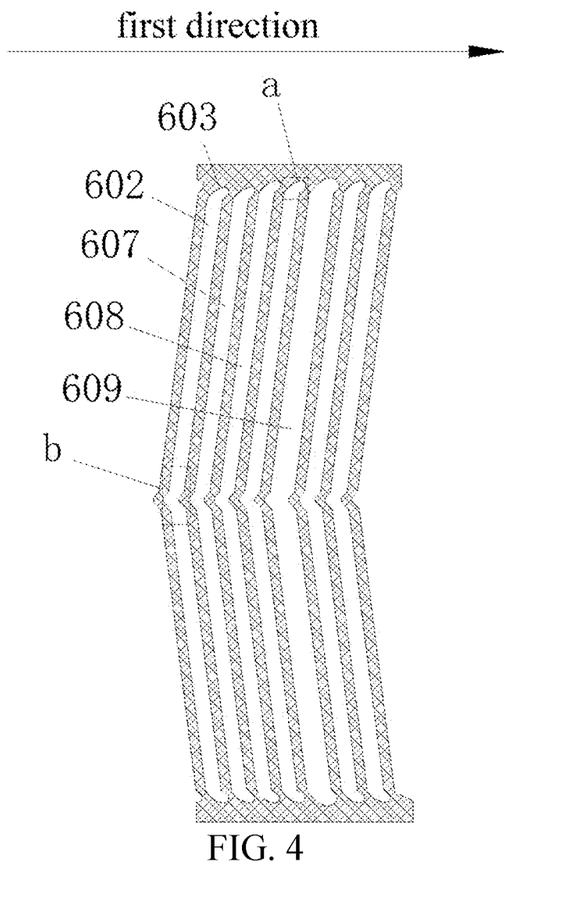
FIG. 4 is a schematic diagram of a structure of a pixel electrode in a display substrate according to an embodiment of the present disclosure.
Figure 5:
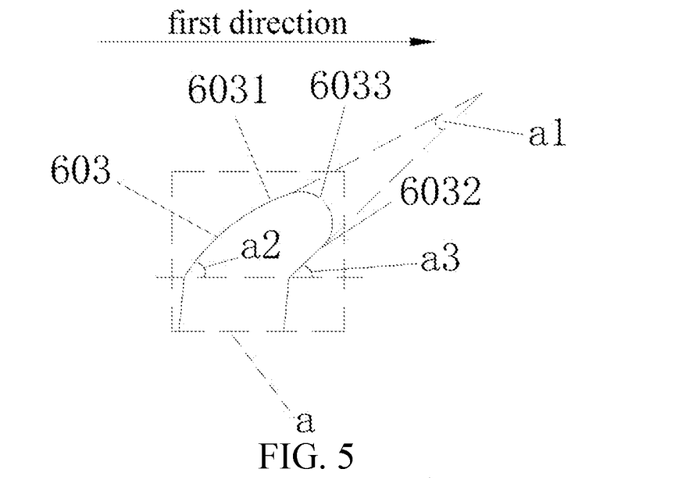
FIG. 5 is a partial enlarged view of a in FIG. 4.

FIG. 4 is a schematic diagram of a structure of a pixel electrode in a display substrate according to an embodiment of the present disclosure. FIG. 5 is a partial enlarged view of a in FIG. 4. In an exemplary implementation, as shown in FIG. 4 and FIG. 5, in the display substrate according to the embodiment of the present disclosure, an end of the first corner end 603 of the pixel electrode 60 has an arc shape protruding along a direction away from the first corner end 603. Under an action of external force, the arc-shaped end of the first corner end 603 in the display substrate according to the embodiment of the present disclosure can improve the problem of disordered arrangement of liquid crystal, enable the liquid crystal arrangement to be recovered more quickly, and improve the problem of trace mura in the liquid crystal display substrate.

In an exemplary implementation, as shown in FIG. 5, the first corner end 603 includes a first edge 6031, a second edge 6032, which are oppositely disposed, and a first transition edge 6033 connecting an end of the first edge 6031 with an end of the second edge 6032. Both the first edge 6031 and the second edge 6032 may be curved or straight. A first included angle a1 is formed between the first edge 6031 and the second edge 6032, and the first included angle a1 may be from 0° to 13°. For example, the first included angle a1 may be 9° to 11°. For example, the first included angle a1 may be 9.5°, 10° or 10.5°. It should be noted that if there is no intersection between the two edges, an included angle between the two edges is an included angle at an intersection point of extension lines of the two edges. If both the first edge 6031 and the second edge 6032 are curved, the first included angle a1 is an angle between the first edge 6031 and the second edge 6032 and a tangent line at the intersection point of the same straight line in the first direction. It should be noted that an angle range enumerated in the present disclosure includes end values, for example, the first included angle a1 may be 0° to 13°, and the third included angle a1 may be 0° or 13°.

The first included angle a1 formed between the first edge 6031 and the second edge 6032 in the display substrate according to the embodiment of the present disclosure can improve the problem of disordered arrangement of liquid crystal, enable the liquid crystal arrangement to be recovered more quickly, and improve the problem of trace mura in the liquid crystal display substrate.

In an exemplary implementation, as shown in FIG. 5, the first edge 6031 forms a second included angle a2 with the first direction and the second included angle a2 may be 35° to 55°. The second edge 6032 forms a third included angle a3 with the first direction, and the third included angle a3 may be 35° to 55°. The second included angle a2 may be same as the third included angle a3. For example, the second included angle a2 and the third included angle a3 may both be 45°. If both the first edge 6031 and the second edge 6032 are curved, the second included angle a2 is an angle between the first direction and a tangent line of the first edge 6031 at an end point close to the interior of the pixel, and the third included angle a3 is an angle between the first direction and a tangent line of the second edge 6032 at an end point close to the interior of the pixel. It should be noted that an angle range enumerated in the present disclosure includes end values, for example, the third included angle a3 may be 35° to 55°, and the third included angle a3 may be 35° or 55°.

In an exemplary implementation, as shown in FIG. 5, the first transition edge 6033 is located at the end of the first corner end 603. The first transition edge 6033 has an arc shape protruding along a direction away from the first corner end 603. The arc-shaped first transition edge 6033 can improve the problem of disordered arrangement of liquid crystal under an action of an external force.

Figure 6:
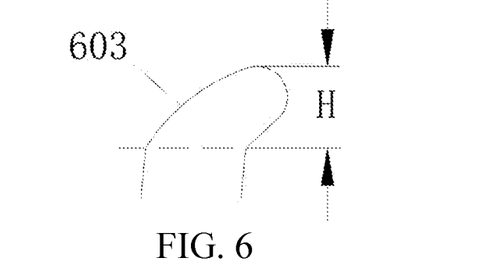
FIG. 6 is a schematic diagram of dimensions of a first corner end in a display substrate according to an embodiment of the present disclosure.

FIG. 6 is a schematic diagram of dimensions of a first corner end in a display substrate according to an embodiment of the present disclosure. In an exemplary implementation, as shown in FIG. 6, an orthographic projection length H of the first corner end in a direction perpendicular to the first direction is greater than or equal to 3 um and less than or equal to 9 um.

Examples 1 to 8 of the display substrate according to an embodiment of the present disclosure are tested under the action of an external force to test recovery time of liquid crystal arrangement and improvement effect of trace mura of the Examples 1 to 8, and the results are shown in Table 1.

TABLE 1

Test results of a display substrate according to an embodiment of the present disclosure

| | Example 1 | Example 2 | Example 3 | Example 4 | Example 5 | Example 6 | Example 7 | Example 8 |
|---|---|---|---|---|---|---|---|---|
| Length H | 4.9 um | 5.5 um | 5.5 um | 5.5 um | 5.5 um | 6.0 um | 6.0 um | 6.5 um |
| a1/a2 (°) | 32.4/53.5 | 45/45 | 50/50 | 55/55 | 60/60 | 45/45 | 55/55 | 45/45 |
| Recovery time | 10.58 | 10.76 | 10.56 | 10.46 | 10.90 | 10.36 | 10.48 | 10.65 |
| Trace mura | 3 stars | 2 stars | 3 stars | 4 stars | 1 star | 5 stars | 4 stars | 2.5 stars |

It can be seen from Table 1 that when the orthographic projection length H of the first corner end in the direction perpendicular to the first direction is 6 um, the second included angle a2 and the third included angle a3 are equal, and when both the second included angle a2 and the third included angle a3 are 45 degrees, under the action of external force, the recovery time of the liquid crystal arrangement is the shortest, and the improvement effect of Trace mura is the best. 5 stars is for the best improvement effect of trace mura (uneven trace) and 1 star is for the worst improvement effect.

Figure 7:
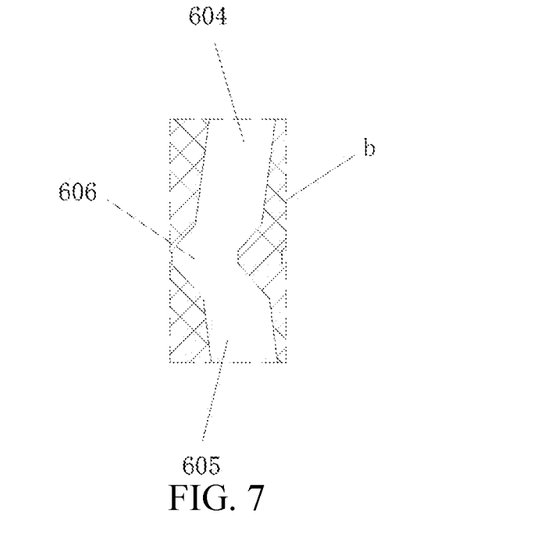
FIG. 7 is a partial enlarged view of b in FIG. 4.

FIG. 7 is a partial enlarged view of b in FIG. 4. In an exemplary implementation, as shown in FIG. 7, the slit 602 further includes a first body portion 604 extending along a third direction, a second body portion 605 extending along a fourth direction, and a connection portion 606 connecting the first body portion 604 with the second body portion 605. The connection portion 606 is V-shaped. The first corner end 603 is located at an end of at least one of the first body portion 604 and the second body portion 605. The first direction, the second direction, the third direction and the fourth direction are all different.

In an exemplary implementation, as shown in FIG. 4, the slit 602 includes first slits 607, a second slit 608, and a third slit 609 located between two adjacent second slits 608. A first corner end 603 of the first slit 607 has a first orthographic projection h1 in a direction perpendicular to the first direction, the first corner end 602 of the second slit 608 has a second orthographic projection length h2 in the direction perpendicular to the first direction, and the first corner end 602 of the third slit 609 has a third orthographic projection length h3 in the direction perpendicular to the first direction, where h3>h2>h1.

In an exemplary implementation, as shown in FIG. 4, the first slit 607 has a first width w1, the second slit 608 has a second width w2, and the third slit 609 has a third width w3, where w3>w2=w1. For example, the first width w1 is 5.1±1 μm; the second width w2 is 5.1±1 μm; the third width w3 is 10.8+2 μm.

The inventor of the present disclosure has found that, in the related art, a slit in a pixel extends in a second direction, an extending direction of the slit is different from an extending direction of a data line, and since the slit is formed above the data line near the data line, the climbing of the slit at the data line will lead to a Rubbing Shadow Region, which needs to be shielded by a Black Mask (BM) layer, resulting in a loss of about 3% of pixel aperture ratio.

In an exemplary implementation, in the display substrate according to the embodiment of the present disclosure, an orthographic projection of the slit 602 on the base substrate 10 is not overlapped with an orthographic projection of the data line on the base substrate 10. For example, the slit 602 may extend along the second direction and be disposed parallel to the data line. The intersection of the slit 602 and the extending direction of the data line is avoided from creating the rubbing shadow region and the pixel aperture ratio is increased.

In an exemplary implementation, as shown in FIG. 2a to FIG. 3b, the display substrate according to the embodiment of the present disclosure further includes a touch signal line 70, wherein an orthographic projection of the touch signal line 70 on the base substrate 10 is at least partially located in an orthographic projection of the third slit on the base substrate 10. The touch signal line 70 passes through an opening region of the pixel 500. The opening region refers to a light-transmissive region in the pixel 500 other than the gate line, the data line, the thin film transistor and the like.

In an exemplary implementation, the touch signal line 70 may be connected with the common electrode 40. In a display stage, the touch signal line 70 may provide a common voltage signal to the common electrode, and in the touch stage, the common electrode acts as a touch electrode, and the touch signal line 70 provides a touch drive signal to the touch electrode (i.e., a common electrode) and receives a sensing signal. Specifically, in a touch stage, when touching occurs, a finger and the common electrode form a capacitor, and a voltage on the common electrode at the touch position changes, and the touch position is determined by detecting the voltage change on the common electrode. In the display stage, a capacitor is formed between the common electrode and the pixel electrode to drive the liquid crystal in the liquid crystal layer (not shown in the figure) to deflect, thereby implementing image display.

Figure 3B:
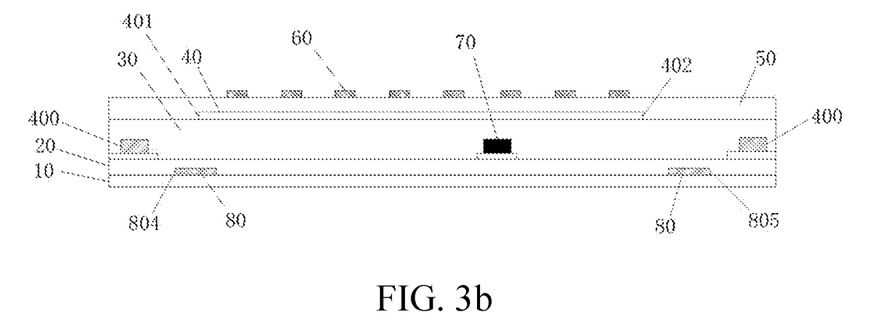
FIG. 3b is a sectional view taken along direction A-A' in FIG. 2b.

In an exemplary implementation, as shown in FIG. 3a and FIG. 3b, a distance from an edge at a first side of the touch signal line 70 to an edge of a first side of the pixel electrode 60 is the same as a distance from an edge of a second side of the touch signal line 70 to an edge of a second side of the pixel electrode 60. The first side of the touch signal line 70 and the first side of the pixel electrode 60 are located at a same side of the display substrate, and the second side of the touch signal line 70 and the second side of the pixel electrode 60 are located at a same side of the display substrate. Moreover, the first side of the touch signal line 70 and the second side of the touch signal line 70 are respectively located at opposite sides of the touch signal line 70 along the first direction, and the first side and the second side of the pixel electrode 60 are respectively located at opposite sides of the pixel electrode 60 along the first direction.

The inventor of that present disclosure has found that, in case of fluctuation of the preparation process of the pixel electrode 60 is not stable, the pixel electrodes 60 located at two sides of the touch signal line 70 are deviated, resulting in inconsistency of distances between the two sides of the touch signal line 70 and the pixel electrodes 60, and asymmetric electric fields at the two sides of the touch signal line 70, leading to a deviation of left transmissivity and right transmissivity, while a fluctuation of transmissivity leads to inconsistent visual brightness, resulting in a defect of stain.

In an exemplary implementation, as shown in FIG. 3, the touch signal line 70 may be arranged in a same layer as the data line 400 and prepared using a same material by a same process. A common electrode 40 is provided between the touch signal line 70 and the pixel electrode 60. An orthographic projection of the common electrode 40 on the base substrate 10 covers an orthographic projection of the touch signal line 70 below the common electrode 40 on the base substrate 10. The common electrode 40 can function as a shielding layer, shielding process fluctuations of the pixel electrode 60, solving the problem of transmissivity fluctuation caused by asymmetry of electric fields on the two sides of the touch signal line 70, and solving the defect of stain.

Figure 8:
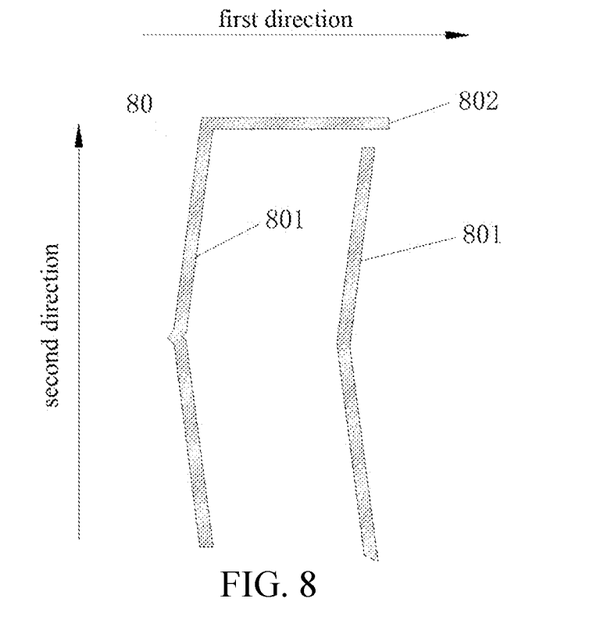
FIG. 8 is a schematic diagram of a structure of a light shielding layer in a display substrate according to an embodiment of the present disclosure.

FIG. 8 is a schematic diagram of a structure of a light shielding layer in a display substrate according to an embodiment of the present disclosure. In an exemplary implementation, as shown in FIG. 3a, FIG. 3b and FIG. 8, the display substrate according to the embodiment of the present disclosure further includes a light shielding layer 80, wherein the light shielding layer 80 at least includes at least one first portion 801 extending along the second direction, the at least one first portion 801 is adjacent to the data line 400 and arranged parallel to the data line 400. The light shielding layer 80 can be used for blocking light for the data line 400.

In an exemplary implementation, the light shielding layer 80 may be a conductor having light shielding properties, for example, the light shielding layer may be an opaque metal. The opaque metal may be an aluminum-based metal, a molybdenum-based metal, a titanium-based metal, a silver-based metal, a copper-based metal, or the like.

In an exemplary implementation, as shown in FIG. 3a, FIG. 3b and FIG. 8, the light shielding layer 80 further includes a second portion 802 extending along the first direction, and the second portion 802 is connected with the at least one first portions 801. The second portion 802 is connected with the common electrode 40 through a first via 90. The at least one first portion 801 is connected with the touch signal line 70 through a second via 100. The light shielding layer 80 reduces a load of the touch signal line 70 and improves touch sensitivity of the touch signal line 70.

In an exemplary implementation, as shown in FIG. 8, the light shielding layer 80 includes two oppositely disposed first portions 801 and one second portion 802, wherein one end of the second portion 802 is connected with one end of one of the two oppositely disposed first portions 801, and the other end of the second portion 802 is disconnected or connected with the other of the two oppositely disposed first portions 801.

In an exemplary implementation, the display substrate according to the embodiment of the present disclosure may achieve a connection or disconnection between adjacent common electrodes 40 through the light shielding layer 80. For example, by connecting or disconnecting the first portions 801 of adjacent light shielding layers 80, the connection or disconnection between the adjacent common electrodes 40 in the first direction may be achieved. By connecting or disconnecting the second portions 802 of adjacent light shielding layers 80, the connection or disconnection between adjacent common electrodes 40 in the second direction may be achieved.

In an exemplary implementation, in the display substrate according to the embodiment of the present disclosure, a distance from an edge of a first side of the pixel electrode 60 to an edge of a first side of the light shielding layer 80 is the same as a distance from an edge of a second side of the pixel electrode 60 to an edge of a second side of the light shielding layer 80. The first side of the pixel electrode 60 and the first side of the light shielding layer 80 are located at the same side of the display substrate, and the second side of the pixel electrode 60 and the second side of the light shielding layer 80 are located at the same side of the display substrate. The first side of the pixel electrode 60 and the second side of the pixel electrode 60 are respectively located at opposite sides of the pixel electrode 60 along the first direction, and the first side of the light shielding layer 80 and the second side of the light shielding layer 80 are respectively located at opposite sides of the light shielding layer 80 along the first direction.

Figure 10:
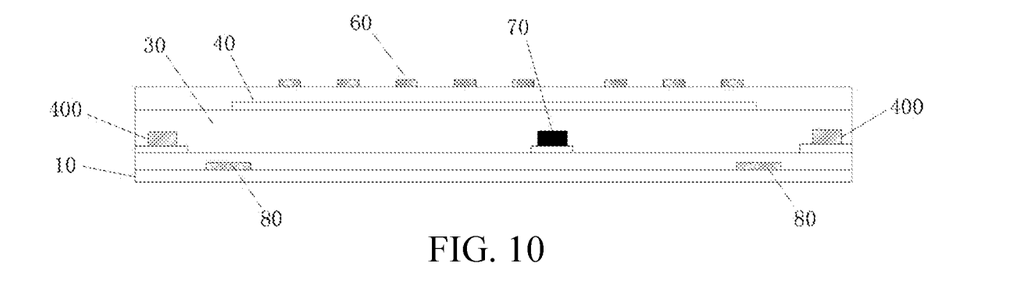

FIG. 10 is a second sectional view taken along direction A-A' in FIG. 2a. In an exemplary implementation, as shown in FIG. 10, in case of fluctuation of the preparation process of the pixel electrode 60, the distance from the edge of the first side of the pixel electrode 60 to the edge of the first side of the light shielding layer 80 is different from the distance from the edge of the second side of the pixel electrode 60 to the edge of the second side of the light shielding layer 80. For example, a distance L1 from the edge of the first side of the pixel electrode 60 to the edge of the first side of the light shielding layer 80 is 0.5 μm, and a distance L2 from the edge of the second side of the pixel electrode 60 to the edge of the second side of the light shielding layer 80 is 2.7 μm.

In an exemplary implementation, as shown in FIG. 2a and FIG. 3a, in the display substrate according to the embodiment of the present disclosure, a distance from an edge of a first side 401 of the common electrode 40 to an edge of a first side 804 of the light shielding layer 80 may be the same as a distance from an edge of a second side 402 of the common electrode 40 to an edge of a second side 805 of the light shielding layer 80. The first side 401 of the common electrode 40 and the first side 804 of the light shielding layer 80 are located at a same side of the display substrate, and the second side 402 of the common electrode 40 and the second side 805 of the light shielding layer 80 are located at a same side of the display substrate. The first side 401 of the common electrode 40 and the second side 402 of the common electrode 40 are respectively located at opposite sides of the common electrode 40 along the first direction, and the first side 804 of the light shielding layer 80 and the second side 805 of the light shielding layer 80 are respectively located at opposite sides of the light shielding layer 80 along the first direction.

In an exemplary implementation, as shown in FIG. 2a and FIG. 3a, an orthographic projection of the first side 401 of the common electrode 40 on the base substrate 10 and an orthographic projection of the first side 804 of the light shielding layer 80 on the base substrate 10 may overlap, and an orthographic projection of the second side 402 of the common electrode 40 on the base substrate 10 and an orthographic projection of the second side 805 of the light shielding layer 80 on the base substrate 10 may overlap.

FIG. 2b is a second schematic diagram of a structure of pixels in a display substrate according to an embodiment of the present disclosure. FIG. 3b is a sectional view taken along direction A-A' in FIG. 2b. As shown in FIG. 2b and FIG. 3b, in the display substrate according to the embodiment of the present disclosure, the distance from the edge of the first side 401 of the common electrode 40 to the edge of the first side 804 of the light shielding layer 80 may be different from the distance from the edge of the second side 402 of the common electrode 40 to the edge of the second side 805 of the light shielding layer 80. The first side 401 of the common electrode 40 and the first side 804 of the light shielding layer 80 are located at a same side of the display substrate, and the second side 402 of the common electrode 40 and the second side 805 of the light shielding layer 80 are located at a same side of the display substrate. The first side 401 of the common electrode 40 and the second side 402 of the common electrode 40 are respectively located at opposite sides of the common electrode 40 along the first direction, and the first side 804 of the light shielding layer 80 and the second side 805 of the light shielding layer 80 are respectively located at opposite sides of the light shielding layer 80 along the first direction.

In an exemplary implementation, as shown in FIG. 2b and FIG. 3b, an orthographic projection of the first side 401 of the common electrode 40 on the base substrate 10 and an orthographic projection of the first side 804 of the light shielding layer 80 on the base substrate 10 may overlap, and an orthographic projection of the second side 402 of the common electrode 40 on the base substrate 10 and an orthographic projection of the second side 805 of the light shielding layer 80 on the base substrate 10 may be not overlapped.

In an exemplary implementation, in the display substrate according to the embodiment of the present disclosure, a distance from the edge of the first side of the common electrode to an edge of a first side of the data line is same as a distance from the edge of the second side of the common electrode to an edge of a second side of the data line. The first side of the common electrode and the first side of the data line are located at a same side of the display substrate, and the second side of the common electrode and the second side of the data line are located at a same side of the display substrate. The first side of the common electrode and the second side of the common electrode are respectively located at opposite sides of the common electrode along the first direction, and the first side of the data line and the second side of the data line are respectively located at opposite sides of the data line along the first direction.

In an exemplary implementation, in the display substrate according to the embodiment of the present disclosure, a distance from the edge of the first side of the common electrode to the edge of the first side of the pixel electrode is same as a distance from the edge of the second side of the common electrode to the edge of the second side of the pixel electrode. The first side of the common electrode and the first side of the pixel electrode are located at a same side of the display substrate, and the second side of the common electrode and the second side of the pixel electrode are located at a same side of the display substrate. The first side of the common electrode and the second side of the common electrode are respectively located at opposite sides of the common electrode along the first direction, and the first side of the pixel electrode and the second side of the pixel electrode are respectively located at opposite sides of the data line along the first direction.

Figure 9:
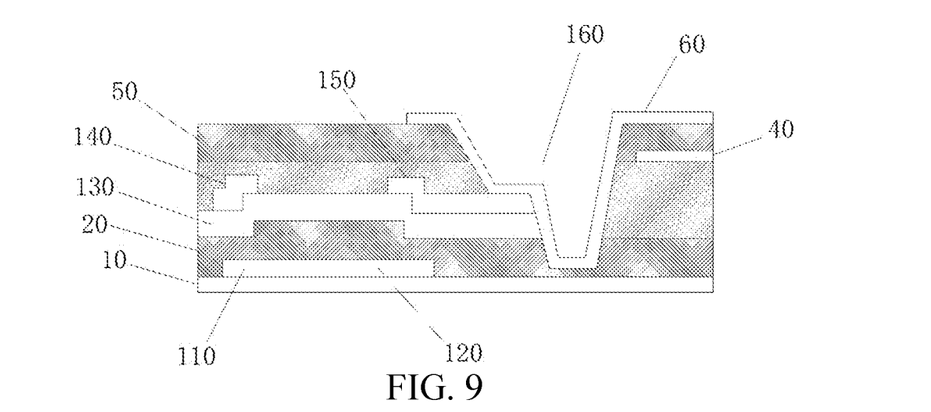

FIG. 9 is a partial sectional view of c in FIG. 2a. In an exemplary implementation, the display substrate according to the embodiment of the present disclosure further includes: a thin film transistor 110, wherein the thin film transistor 110 includes a gate 120 disposed on the base substrate 10, a first insulating layer 20 disposed at a side of the gate 120 away from the base substrate 10 and covering the gate 120, an active layer 130 disposed at a side of the first insulating layer 20 away from the base substrate 10, a source 140 and a drain 150 disposed at a side of the active layer 130 away from the base substrate 10, a second insulating layer 30 disposed at a side of the source 140 and the drain 150 away from the base substrate 10 and covering the source 140 and the drain 150, a common electrode 40 disposed at a side of the second insulating layer 30 away from the base substrate 10, a third insulating layer 50 disposed at a side of the common electrode 40 away from the base substrate 10 and covering the common electrode 40, a pixel electrode 60 is disposed at a side of the third insulating layer 50 away from the base substrate 10. The first insulating layer 20, the second insulating layer 30, and the third insulating layer 50 are provided with vias communicated with each other to form a third via 160. The third via 160 includes a side wall and a bottom wall, wherein the side wall of the third via 160 exposes the drain 150, and the pixel electrode 60 is connected with the drain 150 through the third via 160. Materials of the source 140 and the drain 150 may include an aluminum-based metal such as aluminum or aluminum alloy, a silver-based metal such as silver or silver alloy, a copper-based metal such as copper or copper alloy, a molybdenum-based metal such as molybdenum or molybdenum alloy, etc.

In an exemplary implementation, the gate 120 of the thin film transistor 110 is connected with a gate line, and the gate 120 may be disposed in a same layer as the gate line and prepared using a same material by a same process. The material of the gate 120 may include an aluminum-based metal such as aluminum or aluminum alloy, a silver-based metal such as silver or silver alloy, a copper-based metal such as copper or copper alloy, and a molybdenum-based metal such as molybdenum or molybdenum alloy.

In an exemplary implementation, the source 140 of the thin film transistor 110 is connected with a data line, and the source 140 may be disposed in a same layer as the data line and prepared using a same material by a same process.

The technical solution of the present embodiment is further described below through a preparation process of the display substrate in the present embodiment. The "patterning process" mentioned in the present embodiment includes procedures such as deposition of a film layer, coating of a photoresist, mask exposure, development, etching, and stripping of photoresist, and is a mature preparation process in related art. The "photolithography process" mentioned in the present embodiment includes coating of a film layer, mask exposure and development, and is a mature preparation process in the related art. The deposition may be a known process such as sputtering, evaporation, chemical vapor deposition, the coating may be a known coating process, and the etching may be a known method, which are not specifically limited here. In the description of this embodiment, it should be understood that "thin film" refers to a layer of thin film manufactured by treating a certain material on a substrate with a deposition or coating process. If a patterning process or a photolithography process is not needed for the "thin film" during the entire manufacturing process, the "thin film" may also be referred to as a "layer". If a patterning process or a photolithography process is needed for the "thin film" during the entire manufacturing process, it is referred to as a "thin film" before the patterning process and referred to as a "layer" after the patterning process. The "layer" after the patterning process or photolithography process includes at least one "pattern".

The preparation process of the display substrate in the present embodiment includes:

(1) Forming a pattern of a gate on a base substrate. Forming the pattern of the gate on the base substrate includes: first, depositing a layer of buffer thin film on a base substrate 10 to form a pattern of a buffer layer covering the entire base substrate 10. Sequentially, depositing a first metal thin film, a light shielding material layer and a first insulating thin film on the buffer layer, patterning the first metal thin film by a patterning process to form a gate 120 and a gate line disposed on the buffer layer (not shown in FIG. 9), and patterning the light shielding material layer by a patterning process to form a light shielding layer (not shown in FIG. 9) disposed on the buffer layer, patterning the first insulating thin film by a patterning process to form a first insulating layer 20 covering the gate 120 the gate line and the light shielding layer, as shown in FIG. 9. A material of the gate 120 may include multiple layers of metal which are stacked. For example, the material of the gate 120 may be a first molybdenum metal layer, an aluminum metal layer, and a second molybdenum metal layer which are sequentially stacked, wherein a thickness of the first molybdenum metal layer may be 150 angstroms, a thickness of the aluminum metal layer may be 3000 angstroms, and a thickness of the second molybdenum metal layer may be 800 angstroms. A material of the first insulating layer 20 may be SiNx, and a thickness of the first insulating layer 20 may be 4000 angstroms.

(2) Forming a pattern of an active layer. Forming the pattern of the active layer includes: on the base substrate 10 with the above structure formed, depositing an active layer thin film on the first insulating layer 20 and patterning the active layer thin film by a patterning process to form a pattern of an active layer 130 disposed on the first insulating layer 20, as shown in FIG. 9. A thickness of the active layer 130 may be 1700 angstroms.

(3) Forming patterns of a source, a drain, a data line and a touch signal line. Forming the patterns of the source, the drain, the data line and the touch signal line includes: on the base substrate 10 with the above structures formed, sequentially depositing a second metal thin film and a second insulating thin film on the active layer 130, and patterning the second metal thin film by a patterning process to form patterns of a source 140, a drain 150, a data line (not shown in FIG. 9), and a touch signal line (not shown in FIG. 9), wherein the source 140 and the drain 150 are all connected with the active layer 130. Patterning the second insulating thin film by a patterning process to make the second insulating thin film form a second insulating layer 30 covering the source 140, the drain 150, the data line, and the touch signal line, and forming a first via (not shown in FIG. 9), a second via (not shown in FIG. 9), and a first opening in the second insulating layer 30, wherein the first via exposes the light shielding layer, and the second via exposes the touch signal line. The first opening includes a side wall and a bottom wall, wherein the side wall of the first opening exposes the drain 150, as shown in FIG. 9. Materials of the source 140 and the drain 150 may include multiple layers of metal which are stacked. For example, the materials of the source 140 and the drain 150 may be a first molybdenum metal layer, an aluminum metal layer, and a second molybdenum metal layer which are sequentially stacked, wherein a thickness of the first molybdenum metal layer may be 150 angstroms, a thickness of the aluminum metal layer may be 3000 angstroms, and a thickness of the second molybdenum metal layer may be 800 angstroms. A material of the second insulating layer 30 may be SiNx, and a thickness of the second insulating layer 30 may be 2500 angstroms.

(4) Forming a pattern of a common electrode. Forming the pattern of the common electrode includes: on the base substrate 10 with the above structures formed, sequentially depositing a third metal thin film and a third insulating thin film on the second insulating layer 30, and patterning the third metal thin film by a patterning process to form a pattern of a common electrode 40 disposed on the second insulating layer 30, wherein the common electrode 40 is connected with the light shielding layer through the first via, and the common electrode 40 is connected with the touch signal line through the second via; patterning the third insulating thin film by a patterning process to form a third insulating layer 50 covering the common electrode 40, and forming a second opening in the third insulating layer 50, wherein the second opening is communicated with the first opening to form a third via 160, and the third via 160 exposes the drain 150, as shown in FIG. 9. A material of the common electrode 40 may be ITO, and a thickness of the common electrode 40 may be 700 angstroms.

(5) Forming a pattern of a pixel electrode. Forming the pattern of the pixel electrode includes: on the base substrate 10 with the above structures formed, depositing a fourth metal thin film on the third insulating layer 50, patterning the fourth metal film by a patterning process to form a pattern of a pixel electrode 60 disposed on the third insulating layer 50, wherein the pixel electrode 60 is connected with the drain 150 through a third via 160. A material of the pixel electrode 60 may be ITO, and a thickness of the pixel electrode 60 may be 700 angstroms. The pixel electrode 60 includes at least two strip electrodes 601, a slit 602 is provided between adjacent strip electrodes 601 of the at least two strip electrodes 601, and the slit 602 at least includes a first corner end 603 on at least one end of the slit 602, the first corner end 603 includes a first edge 6031, a second edge 6032, which are oppositely disposed, and a first transition edge 6033 connecting an end of the first edge 6031 with an end of the second edge 6032. Both the first edge 6031 and the second edge 6032 may be curved or straight. A first included angle a1 is formed between the first edge 6031 and the second edge 6032, and the first included angle a1 may be from 0° to 13°. For example, the first included angle a1 may be 9° to 11°. For example, the first included angle a1 may be 9.5°, 10° or 10.5°.

Figure 11:
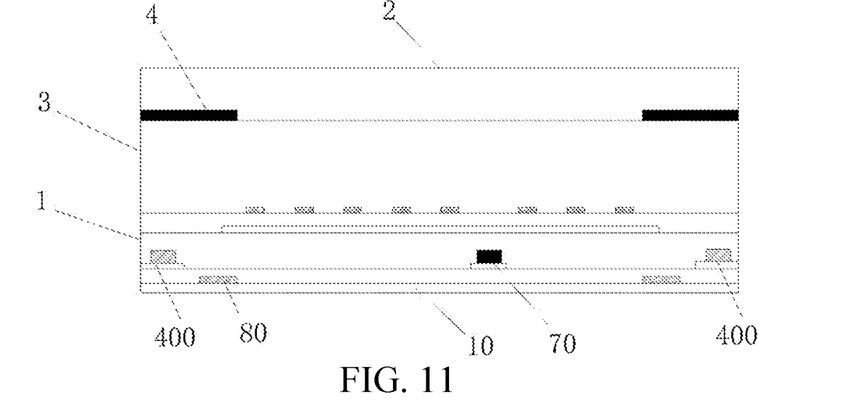
FIG. 11 is a sectional view of a display device according to an embodiment of the present disclosure.

FIG. 11 is a sectional view of a display device according to an embodiment of the present disclosure. As shown in FIG. 11, an embodiment of the present disclosure further provides a display device, which may include the aforementioned display substrate 1 and an opposite substrate 2 which are oppositely disposed, and a liquid crystal layer 3 disposed between the display substrate 1 and the opposite substrate 2. The display substrate 1 may be the aforementioned display substrate.

The liquid crystal layer 3 may include multiple liquid crystal molecules having dielectric anisotropy. An electric field is formed between the display substrate 1 and the opposite substrate 2 so that liquid crystal molecules can rotate in a predetermined direction between the display substrate 1 and the opposite substrate 2, thereby allowing or blocking transmission of light.

In an exemplary implementation, as shown in FIG. 11, the display device according to the embodiment of the present disclosure further includes a black matrix 4, wherein the black matrix 4 is disposed at a side of the opposite substrate 2 facing the display substrate 1. An orthographic projection of the black matrix 4 on the base substrate 10 of the display substrate 1 at least partially covers the data line 400 and the light shielding layer 80, and the black matrix 4 is used for shielding light for the data line 400.

In an exemplary implementation, as shown in FIG. 11, a center axis of the orthographic projection of the black matrix 4 on the base substrate 10 in the display substrate 1 is overlapped with a center axis of an orthographic projection of the common electrode 40 on the base substrate 10 in the display substrate 1. The center axis of the orthographic projection of the black matrix 4 on the base substrate 10 in the display substrate 1 is a center axis extending in a direction perpendicular to the first direction. The center axis of the orthographic projection of the common electrode 40 on the base substrate 10 in the display substrate 1 is a central axis extending in the direction perpendicular to the first direction.

An embodiment of the present disclosure further provides a method for preparing a display substrate, including:

forming a pixel electrode at a side of a base substrate, wherein the pixel electrode includes at least two strip electrodes, a slit is provided between adjacent strip electrodes of the at least two strip electrodes, the slit at least includes a first corner end located on at least one end of the slit, the first corner end includes a first edge and a second edge which are oppositely disposed, and a first transition edge connecting an end of the first edge with an end of the second edge, the first transition edge has an arc shape protruding along a direction away from the first corner end, a first included angle is formed between the first edge and the second edge, and the first included angle is 0° to 13°.

Figure 12:
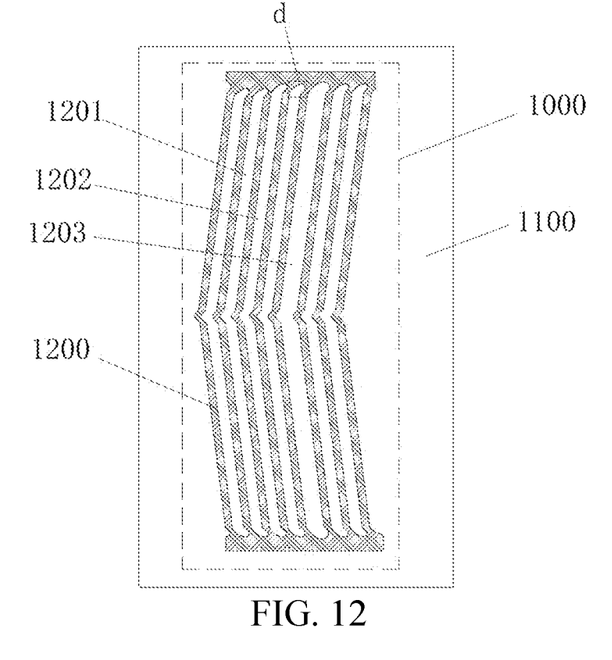
FIG. 12 is a schematic diagram of a structure of a mask according to an embodiment of the present disclosure.
Figure 13:
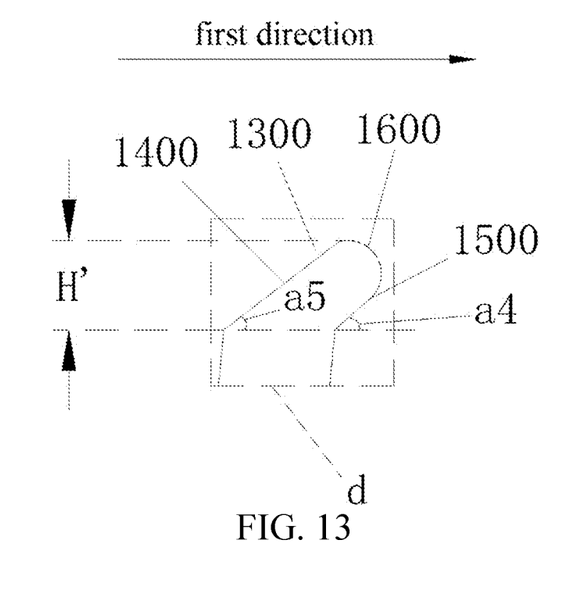
FIG. 13 is an enlarged view of d in FIG. 12.

FIG. 12 is a schematic diagram of a structure of a mask according to an embodiment of the present disclosure. FIG. 13 is an enlarged view of b in FIG. 12. As shown in FIG. 12 and FIG. 13, an embodiment of the present disclosure further provides a mask, including a pattern region 1000 and a non-pattern region 1100 surrounding the pattern region 1000. The pattern region 1000 includes at least one mask pattern 1200, and the at least one mask pattern 1200 is periodically distributed in the pattern region 1000. The mask pattern 1200 has an opening structure and allows light emitted by an exposure light source to pass through. The non-pattern region 1100 is completely closed without an opening and the non-pattern region 1100 does not allow the light emitted by the exposure light source to pass through. The mask pattern 1200 at least includes a second corner end 1300 located on at least one end of the mask pattern 1200, wherein the second corner end 1300 includes a third edge 1400 and a fourth edge 1500, which are oppositely disposed, and a second transition edge 1600 connecting an end of the third edge 1400 with an end of the fourth edge 1500, the second transition edge 1600 has an arc shape protruding in a direction away from the second corner end 1300. The third edge 1400 and/or the fourth edge 1500 are in shape of straight lines, and a fifth included angle is formed between the third edge 1400 and the fourth edge 1500, and the fifth included angle is greater than or equal to 0° and less than or equal to 5°.

In an exemplary implementation, as shown in FIG. 13, the fourth edge 1500 forms a fourth included angle a4 with the first direction and the fourth included angle a4 may be from 35° to 55°. The third edge 1400 forms a fifth included angle a5 with the first direction, and the fifth included angle a5 may be 35° to 55°. The fifth included angle a5 may be the same as the fourth included angle a4. For example, the fifth included angle a5 and the fourth included angle a4 may both be 45°. It should be noted that an angle range enumerated in the present disclosure includes end values, for example, the fifth included angle a5 may be 35° to 55°, and the fifth included angle a5 may be 35° or 55°.

In an exemplary implementation, as shown in FIG. 13, an orthographic projection length H' of the second corner end 1300 in a direction perpendicular to the first direction is greater than or equal to 3 um and less than or equal to 9 um.

In an exemplary implementation, as shown in FIG. 12, the mask pattern 1200 includes first patterns 1201, second patterns 1202, and a third pattern 1203 located between two adjacent second patterns 1202. A second corner end 1300 of the first pattern 1201 has a first orthographic projection length h'1 in the direction perpendicular to the first direction, a second corner end 1300 of the second pattern 1202 has a second orthographic projection length h'2 in the direction perpendicular to the first direction, and a second corner end 1300 of the third pattern 1203 has a third orthographic projection length h'3 in the direction perpendicular to the first direction, where h'3>h'2>h'1.

In an exemplary implementation, as shown in FIG. 12, the first pattern 1201 has a first width w'1, the second pattern 1202 has a second width w'2 and the third pattern 1203 has a third width w'3, where w'3>w'2=w'1. For example, the first width w'1 is 5.1±1 μm; the second width w'2 is 5.1±1 μm; and the third width w'3 is 10.8±2 μm.

In an exemplary implementation, a mask according to an embodiment of the present disclosure may be applied to form a pixel electrode in a display substrate according to an embodiment of the present disclosure.

The drawings of the present disclosure only involve structures involved in the present disclosure, and the other structures may refer to conventional designs. The embodiments in the present disclosure, i.e., features in the embodiments, may be combined with each other to obtain new embodiments if there is no conflict.

Those of ordinary skills in the art should understand that modification or equivalent replacement may be made to the technical solutions of the present disclosure without departing from the spirit and the scope of the technical solutions of the present disclosure, and should all fall within the scope of the claims of the present disclosure.

The invention claimed is:

1. A display substrate, comprising a base substrate and a pixel electrode disposed at a side of the base substrate; the pixel electrode comprises at least two strip electrodes, a slit is provided between adjacent strip electrodes of the at least two strip electrodes, the slit at least comprises a first corner end located on at least one end of the slit, the first corner end comprises a first edge and a second edge which are oppositely disposed, and a first transition edge connecting an end of the first edge with an end of the second edge, wherein the first transition edge is has arc shape protruding along a direction away from the first corner end; a first included angle is formed between the first edge and the second edge, and the first included angle is greater than or equal to 0° and less than or equal to 13°, wherein the slit comprises a first slit, a second slit and a third slit between the first slit and the second slit, an orthographic projection length of a first corner end of the third slit in a direction perpendicular to the first direction is greater than an orthographic projection length of a first corner end of the second slit in the direction perpendicular to the first direction, an orthographic projection length of the first corner end of the second slit in the direction perpendicular to the first direction is greater than an orthographic projection length of a first corner end of the first slit in the direction perpendicular to the first direction.

2. The display substrate according to claim 1, wherein the first included angle is greater than or equal to 9°, and less than or equal to 11°.

3. The display substrate according to claim 2, wherein the first included angle is 9.5°, 10° or 10.5°.

4. The display substrate according to claim 1, further comprising a gate line disposed at a side of the base substrate close to the pixel electrode and extending along the first direction, a first insulating layer disposed at a side of the gate line away from the base substrate, a data line disposed at a side of the first insulating layer away from the base substrate and extending along a second direction, a second insulating layer disposed at a side of the data line away from the base substrate, a common electrode disposed at a side of the second insulating layer away from the base substrate, a third insulating layer disposed at a side of the common electrode away from the base substrate, wherein the pixel electrode is disposed at a side of the third insulating layer away from the base substrate, and the first direction is different from the second direction.

5. The display substrate according to claim 1, further comprising a gate line disposed at a side of the base substrate close to the pixel electrode and extending along the first direction, the first edge forms a second included angle with the first direction, wherein the second included angle is 40° to 50°, and/or, the second edge forms a third included angle with the first direction, and the third included angle is 40° to 50°.

6. The display substrate according to claim 5, wherein the second included angle is same as the third included angle.

7. The display substrate according to claim 1, wherein an orthographic projection length H of the first corner end in a direction perpendicular to the first direction is greater than or equal to 3 um and less than or equal to 9 um.

8. The display substrate according to claim 1, wherein the slit further comprises a first body portion extending along a third direction, a second body portion extending along a fourth direction, and a connection portion connecting the first body portion with the second body portion, wherein the connection portion is V-shaped and the third direction is different from the fourth direction.

9. The display substrate according to claim 1, wherein a width of the third slit is greater than a width of the second slit; and/or, the width of the third slit is greater than the width of the first slit; and/or, the width of the first slit is equal to the width of the second slit; or
the display substrate further comprising a touch signal line, wherein an orthographic projection of the touch signal line on the base substrate is at least partially located within an orthographic projection of the third slit on the base substrate.

10. The display substrate according to claim 4, wherein an orthographic projection of the slit on the base substrate is not overlapped with an orthographic projection of the data line on the base substrate.

11. The display substrate according to claim 4, further comprising a touch control signal line, wherein the touch control signal line is arranged in a same layer as the data line.

12. The display substrate according to claim 11, wherein a distance from an edge of a first side of the touch signal line to an edge of a first side of the third slit is same as a distance from an edge of a second side of the touch signal line to an edge of a second side of the third slit.

13. The display substrate according to claim 4, further comprising a light shielding layer, wherein the light shielding layer at least comprises at least one first portion extending along the second direction.

14. The display substrate according to claim 13, wherein the light shielding layer further comprises a second portion extending along the first direction, and the second portion is connected with the at least one first portion.

15. The display substrate according to claim 14, further comprising a touch signal line, wherein the second portion is connected with the common electrode through a first via, and the at least one first portion is connected with the touch signal line through a second via; or
the light shielding layer comprises two oppositely disposed first portions and one second portion, one end of the second portion is connected with an end of one of the two oppositely disposed first portions, and the other end of the second portion is disconnected or connected with the other of the two oppositely disposed first portions.

16. The display substrate according to claim 15, wherein a distance from an edge of a first side of the common electrode to an edge of a first side of the light shielding layer is same as a distance from an edge of a second side of the common electrode to an edge of a second side of the light shielding layer; and/or, a distance from the edge of the first side of the common electrode to an edge of a first side of the data line is same as a distance from the edge of the second side of the common electrode to an edge of a second side of the data line; and/or, a distance from the edge of the first side of the common electrode to an edge of a first side of the pixel electrode is same as a distance from the edge of the second side of the common electrode to an edge of a second side of the pixel electrode; or
a distance from an edge of a first side of the pixel electrode to an edge of a first side of the light shielding layer is same as a distance from an edge of a second side of the pixel electrode to an edge of a second side of the light shielding layer; or, the distance from the edge of the first side of the pixel electrode to the edge of the first side of the light shielding layer is different from the distance from the edge of the second side of the pixel electrode to the edge of the second side of the light shielding layer.

17. A display device comprising the display substrate according to claim 1.

18. A method for preparing a display substrate, comprising:
forming a pixel electrode at a side of a base substrate, wherein the pixel electrode comprises at least two strip electrodes, a slit is provided between adjacent strip electrodes of the at least two strip electrodes, the slit at least comprises a first corner end located on at least one end of the slit, the first corner end comprises a first edge and a second edge which are oppositely disposed, and a first transition edge connecting an end of the first edge with an end of the second edge, the first transition edge has an arc shape protruding along a direction away from the first corner end; a first included angle is formed between the first edge and the second edge, and the first included angle is greater than or equal to 0° and less than or equal to 13°,
wherein the slit comprises a first slit, a second slit and a third slit between the first slit and the second slit, an orthographic projection length of a first corner end of the third slit in a direction perpendicular to the first direction is greater than an orthographic projection length of a first corner end of the second slit in the direction perpendicular to the first direction, an orthographic projection length of the first corner end of the second slit in the direction perpendicular to the first direction is greater than an orthographic projection length of a first corner end of the first slit in the direction perpendicular to the first direction.

19. A mask, comprising a pattern region, wherein the pattern region comprises at least one mask pattern, the at least one mask pattern at least comprises a second corner end located on at least one end of a mask pattern, the second corner end comprises a third edge, a fourth edge which are oppositely disposed, and a second transition edge connecting an end of the third edge with an end of the fourth edge, the second transition edge has an arc shape protruding along a direction away from the second corner end, a fifth included angle is formed between the third edge and the fourth edge, and the fifth included angle is greater than or equal to 0° and less than or equal to 5°.

* * * * *